Patented Sept. 3, 1940

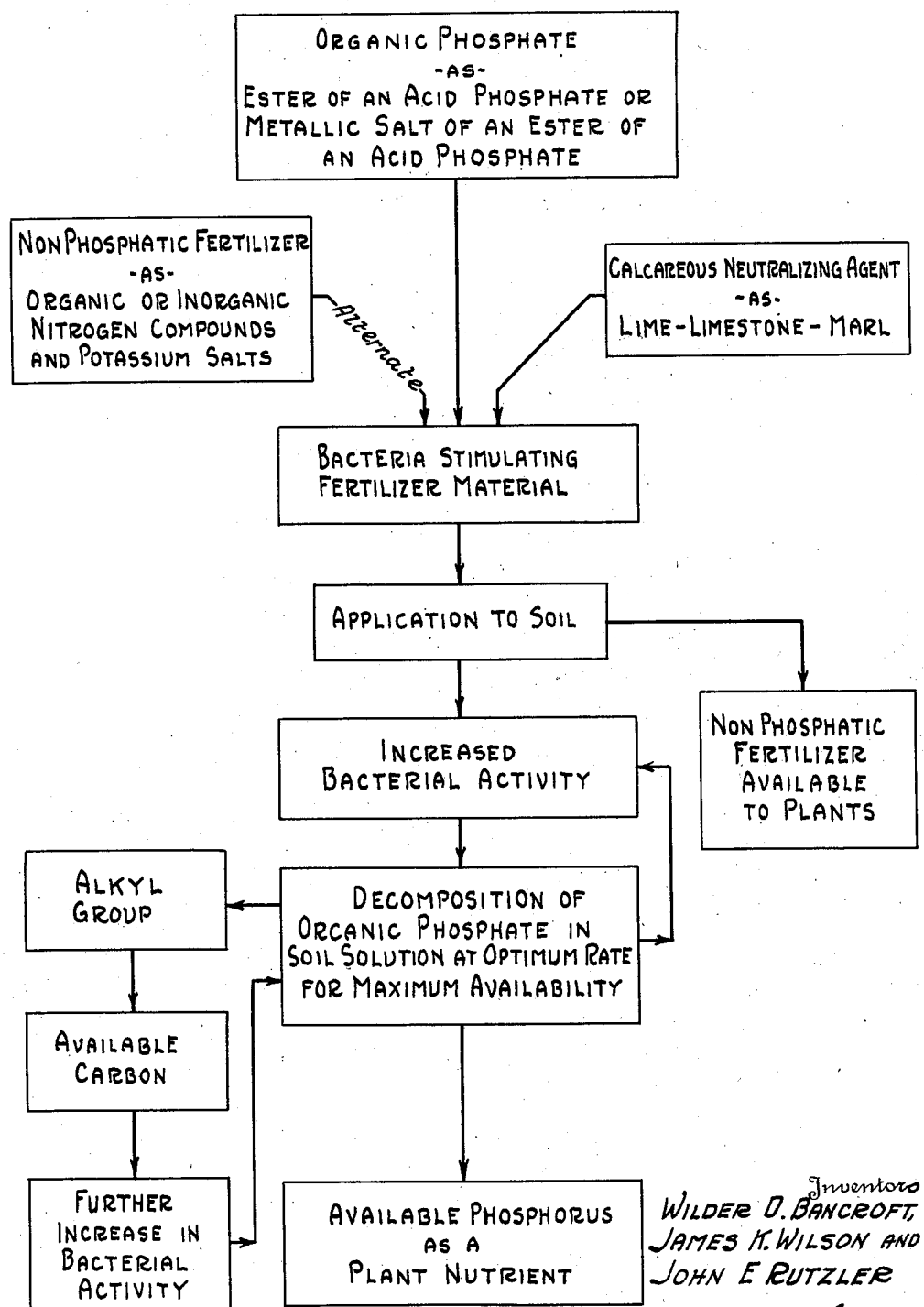

2,213,515

UNITED STATES PATENT OFFICE 2,213,515

MIXTURES OF ORGANIC PHOSPHATES AND CALCAREOUS NEUTRALIZING AGENTS

Wilder D. Bancroft, James K. Wilson, and John E. Rutzler, Jr., Ithaca, N. Y.

Application July 13, 1938, Serial No. 219,062

4 Claims. (Cl. 71—27)

Our invention relates to mixtures of fertilizing materials, and more particularly to mixtures of soluble organic phosphates, which revert slowly into an insoluble form when in contact with solutions in the soil, with calcareous neutralizing agents which will cause them to decompose in the soil with greater rapidity. This application is a continuation-in-part of our copending application Serial No. 170,289 which was filed October 21, 1937.

We have found, for example, that the different methyl and ethyl phosphates and the esters formed from phosphoric acids and monohydric alcohols, such as the various propyl and isopropyl phosphates, are not available for the use of many varieties of growing plants until the alkyl radical has been split off in the soil solution.

As this splitting off of the alkyl radical ordinarily does not take place for several weeks after these organic phosphates have been applied to the soil, it is obvious that in the case of many crops relatively little of the phosphorus or carbon in these organic phosphates is available to the plants during the first part of the growing season. This is an important limitation upon the effectiveness of organic phosphates of the types mentioned above because there is strong evidence that many crops remove most of the phosphorus required for growth to maturity during the first few weeks of the growing season.

One of the objects of our invention is to overcome these difficulties.

Still another object of our invention is to increase the rate at which the phosphorus and carbon of organic phosphates become available to the plant by applying to the soil previously prepared mixtures of organic phosphates and calcareous neutralizing agents.

The single sheet of drawings discloses a diagrammatic representation of our invention.

It is a well known fact that microorganisms are usually in a state of low activity in many acid soils. As a result, these soils contain a large store of unavailable nitrogen which is released when calcareous neutralizing agents are applied thereto, and bacterial activity is therefore stimulated by this modification of the acidity of the soil.

In this connection, we have found that by applying a mixture of an organic phosphate and a calcareous neutralizing agent simultaneously to the soil, especially to rather acid soils, a condition is produced which results in the stimulation of the microflora of the soil to such a degree that the rate at which the organic phosphates are broken down is increased so as to assure the availability of its constituents at an early period in the growth of the plant. However, this increased rate of decomposition is not sufficient to decompose these organic phosphates before they have had the opportunity of being widely distributed throughout the soil. As this increase in bacterial stimulation is brought about by the coaction of the organic phosphate and the calcareous neutralizing agent, it is preferable to apply them to the soil simultaneously, and, to accomplish this purpose, the simplest procedure is to prepare a mixture of these materials and apply them directly to the soil.

In this connection it should be noted that the use of a mixture of an organic phosphate and a calcareous neutralizing agent will result in a greater increase in plant growth than can be obtained if one constituent of the mixture is first added to the soil and the remaining constituent is added at a later time. This definitely establishes that the action of the two component constituents of the mixture is more than merely additive when they are applied to the soil as a mixture. A major reason for this resides in the fact that calcareous neutralizing agents do not diffuse nearly as rapidly in soil solution as do organic phosphates. As a result, if the two are applied separately and the organic phosphate is applied first, especially when the soil is moist as is usually the case when fertilizers are applied, the organic phosphates will diffuse rapidly, and when the calcareous neutralizing agent is applied later, the optimum of organic phosphate will not be present in the zone of intensified bacterial activity which is produced by the introduction of the calcareous neutralizing agent.

On the other hand, if the calcareous neutralizing agent is applied to the soil several days prior to the application of the organic phosphate, undesirable conditions for maximum plant growth will prevail. This is caused by the fact that, in acid soils to which calcareous neutralizing agents would be applied, intense bacterial activity often results soon after application. This activity is at first confined to a shallow upper layer of the soil, and therefore, if the organic phosphate is applied several days later, it may become fixed in an unavailable form in this shallow layer before it has time to diffuse to the lower layers of the soil where it is most effective. Moreover, even if one of the constituents is applied shortly after the other, a distribution problem arises due to the fact that there are many small areas in any given field in which the geographic proximity of the two constituents will not be as close as is desirable to bring about an optimum decomposing action of the microorganisms of the soil on the organic phosphate. It is, therefore, obvious that the increased plant growth produced by the application of the two constituents in the form of a mixture results from the fact that by this means the organic phosphate is kept in the geographical proximity of the most intense bacterial activity for the longest time consistent with the wide difference in diffusibiliy of the two compounds.

However, we have found that, when the two constituents are used together, the phosphate diffuses away from the calcareous material to some extent, but at the same time the organic phosphate is partly decomposed owing to the increased bacterial activity introduced by the change in the acidity of the soil in the immediate vicinity of the phosphate molecule. In this connection it should be noted that the organic phosphate itself aids the increased bacterial activity brought about by the neutralizing agent, and some of this increased activity is carried to the lower layers with the diffusing phosphate, a circumstance which would not result if either agent was added to the soil some time in advance of the other.

*Example I*

In this example of our invention, suitable mixtures of organic phosphates and calcareous neutralizing agents for obtaining the maximum fertilizing value from the organic phosphate will be given. The resulting products are ready for application to the land. In very acid soils such as Volusia, for example, organic phosphates tend to decompose by hydrolysis to form an alcohol and phosphoric acid regardless of bacterial activity. Bacterial activity is low in such acid soils and they frequently contain large supplies of unavailable nitrogen as a result. It is not desirable to have organic phosphates decompose with the liberation of alcohol in the soil under these conditions because the bacteria cannot then utilize the alkyl part of the compounds to the best advantage.

However, by adding limestone, marl or lime to the soil in admixture with organic phosphates, much better conditions obtain in the soil for the maximum utilization of said organic phosphate by both plants and bacteria. When such a soil solution is partly neutralized there is an enormous increase in bacterial activity with a resultant increase in soil fertility.

In the mixtures to be disclosed the calcareous neutralizing agent functions to increase bacterial activity, the bacteria utilize the organic phosphate and grow even more rapidly; thus they decompose the organic phosphate so that it becomes more available as a plant nutrient. The increased bacterial activity due to the neutralizing agent and that due to the organic phosphate results in a release of nitrogen in a form which is available to plants. If the neutralizing agent is added to the soil either before or after the organic phosphate, the full benefit of the alkyl group of said phosphate is not obtained. We therefore prefer for this reason and others which we have stated to use a mixture of the organic phosphate and a calcareous neutralizing agent. Examples of such mixtures follow:

(1)

| | Pounds |
|---|---|
| Limestone | 2000 |
| Dimethyl monocalcium phosphate | 125 |

(2)

| | Pounds |
|---|---|
| Marl | 750 |
| Diisopropyl monocalcium phosphate | 100 |

(3)

| | Pounds |
|---|---|
| Lime | 1000 |
| Triethyl phosphate | 90 |

(4)

| | Pounds |
|---|---|
| Limestone | 1000 |
| Potassium dimethyl phosphate | 125 |

We may prefer to incorporate in such mixture as these other plant nutrients and bacterial stimulants such, for example, potassium chloride, sodium nitrate, copper or manganese salts. Also, it should be understood that the proportion of organic phosphate to calcareous neutralizing agent can be varied over a wide range. For example, we may employ anywhere from 1:1 mixture to a 1:20 mixture, the first figure referring to the organic phosphate in each case, in the practice of our invention. The important thing is to stimulate the soil microorganisms to increase their rate of growth by means of plant nutrients or other stimulants so that the organic phosphate can be made more available to the crop plants than it is in the undecomposed form as soon as it has spread well over the soil profile.

While we have described, for purposes of illustration, several forms of our invention, it is obvious that any ester of an acid of phosphorus having less than two hydroxyl groups attached to carbon or any metallic salt of an acid ester of an acid of phosphorus having less than two hydroxyl groups attached to carbon may be used in our fertilizer mixture. Moreover, although in the examples given above only one calcareous material is used in each mixture, if desired, several forms of these calcareous materials may be used to form the neutralizing constituent of these mixtures.

We claim:

1. A new fertilizer comprising a mixture of a calcareous material and a metallic salt made from an ester produced by the interaction of a monohydric alcohol of the paraffin group having less than four carbon atoms, and an acid of phosphorus having less than two hydroxyl groups attached to carbon, one unesterified hydrogen of the said acid having been replaced with a metallic plant nutrient, the proportions of the calcareous material being seven and one half to sixteen times as great by weight as the organic compound, said calcareous material serving as an agent to increase the rate of decomposition of the said organic phosphate.

2. A new fertilizer comprising a mixture of limestone and dimethyl monocalcium phosphate in the proportions by weight of sixteen parts of limestone and one part of the said phosphate, said limestone serving as an agent to increase the rate decomposition of the said organic phosphate.

3. A new fertilizer comprising a mixture of marl and diisopropyl monocalcium phosphate in the proportions by weight of seven and a half parts of marl to one part of the said phosphate, said marl serving as an agent to increase the rate of decomposition of the said organic phosphate.

4. A new fertilizer comprising a mixture of limestone and potassium dimethyl phosphate in the proportions by weight of eight parts of limestone and one part of the said phosphate, said limestone serving as an agent to increase the rate of decomposition of the said organic phosphate.

WILDER D. BANCROFT.
JAMES K. WILSON.
JOHN E. RUTZLER, Jr.